United States Patent [19]
Sanders

[11] 3,728,434
[45] Apr. 17, 1973

[54] TREATMENT OF METAL HYDRIDES

[75] Inventor: Robert N. Sanders, Baton Rouge, La.

[73] Assignee: Ethyl Corporation, Richmond, Va.

[22] Filed: Feb. 6, 1968

[21] Appl. No.: 707,360

[52] U.S. Cl. ...................... 423/274, 55/58, 55/74, 149/87, 423/645, 423/646, 423/647, 423/267
[51] Int. Cl. ................................................ C01b 6/04
[58] Field of Search .................. 23/204, 360, 361, 23/365, 366; 55/58, 74; 149/87; 423/267, 274, 645, 646, 647

[56] References Cited

UNITED STATES PATENTS

| | | |
|---|---|---|
| 3,366,453 | 1/1968 | Kloepfer et al. .................. 23/204 |
| 3,116,112 | 12/1962 | Jenkner ............................... 23/204 |
| 2,425,712 | 8/1947 | Alexander ........................... 23/204 |

OTHER PUBLICATIONS

Coates et al., Journal of Chemical Society, "Di Tert Butylberyllium and Beryllium Hydride," 1954, pg. 2,526–2,529.

Primary Examiner—Carl D. Quarforth
Assistant Examiner—F. M. Gittes
Attorney—Donald L. Johnson

[57] ABSTRACT

Metal hydrides prepared under nitrogen or other highly adsorbed gas are treated to reduce evolution of such gas upon slurrying with inert liquids by (1) heating under reduced pressure to 100° to 200° C. for 1 to 24 hours, (2) contacting with helium, hydrogen or other slightly adsorbed gas and (3) cooling to ambient temperature in contact with the latter gas.

11 Claims, No Drawings

TREATMENT OF METAL HYDRIDES

This invention relates to a novel method for treating metal hydrides to reduce the amount of gas released when the hydrides are slurried with various carried liquids.

During their preparation, purification and storage, metal hydrides are commonly exposed to an inert atmosphere in order to prevent reduction of product purity by reaction of raw materials, intermediates or products with reactive contaminants. For this purpose beryllium hydride, for example, has been handled and stored under dry nitrogen. Such treatment results in the adsorption on the surface of the hydride particles of a relatively large quantity of gas, part of which is evolved, often with vigorous foaming, when the hydride is subsequently suspended in any of certain carrier liquids. Such foaming constitutes a hazard in certain utilities such as the use of the hydride as a component of rocket fuels.

Accordingly, it is an object of the present invention to provide metal hydrides which are not associated with the above-mentioned hazards.

Another object of this invention is to provide metal hydrides characterized by reduced gas evolution upon slurrying with carrier liquids.

A further object of this invention is to provide an improved method for the production of metal hydrides of reduced gas evolution characteristics. Other objects will appear hereinafter.

In accordance with this invention it has now been found that when metal hydrides, both simple, such as the hydrides of the alkali and alkaline earth metals, and complex, such as the boranates and alanates of the alkali and alkaline earth metals, prepared, purified or stored under nitrogen or other highly adsorbed inert gas, are heated under reduced pressure for a prolonged period, are then contacted with hydrogen, helium or other slightly adsorbed gas and are cooled to ambient temperature in contact with the slightly adsorbed gas, the product is found to have the property of greatly reduced gas evolution upon slurrying with a carrier liquid. The foregoing process constitutes an embodiment of this invention.

A further embodiment of this invention comprises heating a metal hydride as above defined at a temperature of from about 70° to about 200° C. under an absolute pressure of from about 0.001 to about 100 millimeters of mercury and for a period of about 15 minutes to about 24 hours, contacting the hydride with dry hydrogen under a pressure ranging from about 100 millimeters of mercury to about 10 atmospheres and cooling the hydride to ambient temperature in contact with the dry hydrogen.

A preferred embodiment of this invention comprises heating veryllium hydride containing a relatively large quantity of nitrogen adsorbed thereon to a temperature of from about 120° to 140° C. under a reduced pressure of from about 5 to about 50 millimeters of mercury absolute and for a period of from about 15 minutes to about 24 hours, contacting the beryllium hydride with dry helium under a pressure of 100 millimeters of mercury to 10 atmospheres and cooling the beryllium hydride to ambient temperature in contact with the dry helium.

Other embodiments will appear hereinafter.

The process of the present invention exhibits a number of significant advantages over perviously known processes for the preparation, purification and storage of metal hydrides. Specifically, this process minimizes the amount of gas adsorbed on the surface of particles of metal hydrides during preparation, purification and storage thereof, it reduces the foaming which occurs when the metal hydrides are suspended in carrier liquids, and it results in purer and more dense products when the hydrides are subjected to crystallization at high temperature. The foregoing advantages combine to increase greatly the value and utility of these hydrides as components of high energy fuels.

The invention will be more fully understood by reference to the following set of illustrative examples in which, unless otherwise specified, all parts and percentages are by weight.

The experiments were carried out in manometric gas collection units each consisting of a round-bottom flask connected through a side tube to a mercury manometer. These units, when charged with the metal hydride-liquid carrier mixture and sealed off, had a working volume of 10 to 12 milliliters. A constant ullage of about 23 percent was maintained by raising or lowering the pressure on the external arm of the manometer to equalize the levels of the two mercury legs and measuring this pressure with an auxiliary manometer.

EXAMPLE 1

Beryllium hydride prepared by the solution pyrolysis of di-tertiary butyl beryllium was baked at 130° C. for 23 hours, then contacted with dry nitrogen and immediately cooled. A sample of the hydride weighing 1.76 grams was immediately slurried with 4.60 grams of diethyl beryllium in a gas collection unit. The unit was sealed and immersed in an oil bath at a temperature maintained at 31.7° to 31.8° C. An initial rapid pressure rise of 446 millimeters of mercury was observed over a period of 2 days followed by a further slow rise of about 50 millimeters over a period of about 5 months.

When the procedure of Example 1 is repeated replacing the diethyl beryllium with triethyl aluminum, similar results are obtained.

COMPARATIVE EXAMPLE

The procedure of Example 1 was repeated except that, prior to the gas evolution measurement, the beryllium hydride sample was stored under dry nitrogen for 1 week. An initial pressure rise of 1,066 millimeters was observed.

EXAMPLE 2

Beryllium hydride was ground for 5 minutes, then placed in a flask, evacuated to 0.8 millimeter of mercury and heated in an oil bath at 130° C. for 23 hours. The vacuum was broken with dry helium and the product was cooled immediately to room temperature.

EXAMPLE 3

A sample of the product of Example 2 was slurried with diethyl beryllium as in Example 1. An initial pressure increase of 296 millimeters of mercury was observed.

EXAMPLE 4

A sample of the product of Example 2 was stored under dry helium for 1 week, then slurried with diethyl beryllium as in Example 1. An initial pressure increase of 295 millimeters was observed.

EXAMPLE 5

A sample of beryllium hydride was treated as in Example 2 except that the vacuum was broken with dry argon. The product was then slurried with diethyl beryllium as in Example 1. An initial pressure increase of 361 millimeters was observed.

EXAMPLE 6

A sample of beryllium hydride was treated as in Example 2 except that the vacuum was broken with dry argon after which the product was stored under dry argon for 1 week. It was then slurried with diethyl beryllium as in Example 1. An initial pressure increase of 338 millimeters was observed.

The gas desorption process of this invention can be applied not only to beryllium hydride as illustrated above but to the hydrides of lithium, sodium, potassium, rubidium, cesium, magnesium, calcium, strontium, barium, aluminum, titanium and zirconium, to the boranates and alanates of the alkali and alkaline earth metals, and to other simple and complex hydrides.

The desorbing gas can be any gas, inert with respect to the hydride, which is less strongly adsorbed than the gas originally adsorbed on the hydride. In general, that gas is least adsorbed which exhibits most nearly the properties of an ideal gas. Thus, the lower the condensation temperature of the gas, the farther it is removed, at ambient temperature, from the liquid state, the closer its approach to the ideal gas state and, other things being equal, the lower the degree of adsorption which it exhibits. This is why helium and hydrogen, which have lower condensation temperatures than any other known gases, are the desorption agents of choice. However, neon, argon, krypton and xenon are also satisfactory desorption agents under appropriate conditions.

Prior to use as components of high-energy fuels, hydride slurries such as those described above are pumped down to low pressures to remove low-energy contaminants. In repeated experiments, it has been found that hydrides desorbed with helium produce no foaming upon slurrying with one of the carrier liquids cited herein even when the pressure over the resulting slurry is rapidly reduced. When argon is used, some foaming is observed unless the pressure is reduced very slowly indeed.

For highly polymeric hydrides, such as that of beryllium, which are completely water-stable at ambient temperature, it is a relatively simple matter to determine the amount of gas adsorbed by such hydrides under specified conditions. Thus, for example, the amount of helium adsorbed as a result of the treatment described above can be measured by contacting the beryllium hydride with water at ambient temperature. The water is very strongly adsorbed by the hydride, and the displacement of the helium is therefore essentially complete. The system is cooled below 0° C. to freeze the excess water and thereby reduce its vapor pressure. The gases are then completely separated by pumping and are analyzed for water and helium by means of a mass spectrometer.

Carrier liquids which may be used in the process of this invention include trimethylaluminum, diethylaluminum hydride, dimethylaluminum hydride, triethylborane, tetraethyl diborane, beryllium bis(triethylaluminum hydride), beryllium bis(diethyl borohydride), beryllium bis(dimethyl ethyl aluminum hydride), beryllium bis(trimethylaluminum hydride), cyclopentadienyl beryllium hydride, pentaborane, hexaborane, decaborane and mixtures of two or more of the foregoing. Other suitable carriers include the alane-terminated beryllium hydrides such as beryllium hydride bis(dimethylaluminum hydride), beryllium hydride bis(diethylaluminum hydride), and beryllium hydride bis(dicyclopentadienyl aluminum hydride), and the borane-terminated beryllium hydrides such as beryllium hydride bis(dimethylborane), beryllium hydride bis(diethylborane), and beryllium hydride bis(dicyclopentadienyl borane), and mixtures of any two or more of the above. In general, the carrier may be any liquid which is inert with respect to the particular hydride or hydride mixture in use and which wets the surface thereof.

The gas desorption temperature can range from 70° to 200° C., the range from 120° to 140° C. being preferred because it is high enough to bring about maximum desorption in a reasonable time such as 1 day, and is low enough to avoid any appreciable thermal decomposition of the beryllium hydride itself.

The desorption pressure can range from 0.001 millimeter of mercury or less to 100 millimeters or more. In order to obtain a practical desorption rate it is desirable to employ the minimum attainable pressure. The preferred pressure is therefore in the range of 5 to 50 millimeters, which is the lowest pressure range conveniently available in commerical equipment.

The time required for essentially complete desorption depends, of course, upon the other reaction conditions. It can vary from 15 to 20 minutes at 200° C. and 0.01 millimeter to periods of a day or more at low temperature and at pressures in excess of 10 millimeters of mercury.

As indicated above, the low-molecular-weight hydrides of this invention have considerable importance as components of high-energy fuels. They are also a source for the production by thermal decomposition of the corresponding pure metals for use in alloys and are useful as chemical raw materials.

I claim:

1. The process of pretreating a metal hydride having associated therewith a large quantity of highly adsorbed gas to reduce the tendency thereof to foam when slurried in an inert liquid, said metal hydride being an alkali or alkaline earth metal hydride, boranate or alanate or a hydride of aluminum, titanium or zirconium, which comprises heating said metal hydride at a temperature of from 70 ° to 200° c. under an absolute pressure ranging from about 0.001 to about 100 millimeters of mercury and for a period of from about 15 minutes to about 24 hours and thereupon exposing said hydride to a gas inert with respect to said metal hydride, and having a lower tendency than said highly adsorbed gas to become adsorbed on said hydride, and cooling said hydride to ambient temperature in a contact with said inert gas.

2. The process of reducing foaming during the preparation of a slurry, in a suitable inert carrier, of a metal hydride having associated therewith a large quantity of highly adsorbed gas, which comprises utilizing as said hydride a hydride treated by the process of claim 1.

3. The process of claim 1 wherein said metal hydride is beryllium hydride.

4. The process of claim 1 wherein said inert gas is helium.

5. The process of claim 1 wherein said inert gas is hydrogen.

6. The process of claim 1 wherein said temperature is in the range of from about 120° to about 140° C.

7. The process of claim 1 wherein said absolute pressure pressure is in the range of from about 5 to about 50 millimeters of mercury.

8. The process of claim 1 wherein said metal hydride is beryllium hydride and said inert gas is hydrogen or helium.

9. The process of claim 1 wherein said metal hydride is beryllium hydride, said inert gas is hydrogen or helium, said temperature is in the range of from about 120° to about 140° C. and said absolute pressure is in the range of from about 5 to about 50 millimeters of mercury.

10. As a composition of matter, beryllium hydride having an inert gas selected from the group consisting of hydrogen, helium, neon, argon, krypton and xenon adsorbed thereon in an amount approximating the upper adsorption limit of said gas on said hydride.

11. The composition of claim 10 wherein said inert gas is hydrogen or helium.

* * * * *